US005601928A

United States Patent [19]

Katayama et al.

[11] Patent Number: 5,601,928

[45] Date of Patent: Feb. 11, 1997

[54] SHEET FOR MARKING, MARKED SHEET, AND METHOD FOR MANUFACTURING SAID SHEET

[75] Inventors: Masato Katayama, Yokohama; Eiichi Suzuki, Asaka; Mamoru Sakaki, Yamato; Akio Kashiwazaki, Yokohama; Mifune Hirose, Machida, all of Japan

[73] Assignee: Canon Kabushiki Kaisha, Tokyo, Japan

[21] Appl. No.: 310,334

[22] Filed: Sep. 22, 1994

[30] Foreign Application Priority Data

| | | | |
|---|---|---|---|
| Sep. 24, 1993 | [JP] | Japan | 5-238022 |
| Jun. 3, 1994 | [JP] | Japan | 6-122327 |

[51] Int. Cl.[6] B32B 27/00

[52] U.S. Cl. 428/500; 428/195; 428/203; 428/207; 428/213; 428/323; 428/411.1; 428/483

[58] Field of Search 428/195, 204, 428/411.1, 485.4, 913, 203, 207, 213, 323, 483, 500

[56] References Cited

U.S. PATENT DOCUMENTS

| | | | |
|---|---|---|---|
| 4,785,313 | 11/1988 | Higuma et al. | 346/135.1 |
| 4,832,984 | 5/1989 | Hasegawa et al. | 427/161 |
| 4,954,395 | 9/1990 | Hasegawa et al. | 428/318.4 |
| 5,027,131 | 6/1991 | Hasegawa et al. | 346/1.1 |
| 5,059,983 | 10/1991 | Higuma et al. | 346/1.1 |
| 5,140,339 | 8/1992 | Higuma et al. | 346/1.1 |

FOREIGN PATENT DOCUMENTS

| | | |
|---|---|---|
| 54-59936 | 5/1979 | Japan . |
| 62-280068 | 12/1987 | Japan . |
| 5-165246 | 7/1993 | Japan . |

*Primary Examiner*—William A. Krynski
*Attorney, Agent, or Firm*—Fitzpatrick, Cella, Harper & Scinto

[57] ABSTRACT

Disclosed is a marked sheet, wherein an intermediate layer, a transparent ink retaining layer and an opaque ink transporting layer are sequentially provided on the rear surface of a transparent sheet having an uneven pattern on the front surface, and a pattern is formed in the ink retaining layer.

15 Claims, 4 Drawing Sheets

SHEET FOR MARKING, MARKED SHEET, AND METHOD FOR MANUFACTURING SAID SHEET

BACKGROUND OF THE INVENTION

1. Field of the Invention

The present invention relates to a sheet for marking and a marked sheet member used for display and decoration in a form to be stuck on the surfaces of things such as buildings, building materials, vehicles, ships, machines, instruments, sundry goods, household articles, or toys. More particularly, the present invention relates to a large size marked sheet having a clear and precise pattern used for interior decorations such as a wall sheet, sliding door sheet, and window glass decorative sheet; and a sheet for marking which is used as a material for manufacturing the above marked sheet. The present invention further concerns a method of simply manufacturing the above marked sheet member at a low cost.

2. Related Art

In a conventional marked film, a character or pattern has been usually printed on one surface of a resin film by screen printing or gravure printing. Additionally, as a sheet for interior decoration such as a wall sheet, a type using a polyvinyl chloride resin film has been generally applied, because the polyvinyl chloride resin film exhibits a soft feeling and calm brightness, and easily forms a three-dimensional patterning on the surface.

In the conventional marked film sheet, patterns have been repetitive and relatively simple, and further the selection of the pattern has been restricted ready-made patterns, and accordingly, a user could not easily obtain a marked sheet having a desired pattern with an original design.

The conventional marked film sheet, which forms each pattern by printing, has a disadvantage in that it must make a stereotype plate for each pattern. For example, even in manufacturing marked film sheets having a desired pattern with original design on a small scale (such as an amount required for personal use), the equipment, labor and cost required are substantially the same as in the mass-production of ready-made sheets. Additionally, the conventional marked sheet has the limitation of continuously forming a multi-color and precise pattern or a complex pattern without any repetition.

Unexamined Japanese Patent Publication No. HEI 5-165246 discloses a marked film sheet in which a pattern is formed using a color copying machine of the electrophotographing type. This method enables a suitable pattern to be relatively easily formed. However, the method using the electrophotographing technique requires a plurality of photosensitive drums each having a size equivalent to the width of a substance to be copied for forming a toner image and transferring the image to the substance to be copied; accordingly, in the viewpoint of the size of the apparatus, the method has difficulty in continuously manufacturing a large size marked sheet having a width ranging from one to several meters.

SUMMARY OF THE INVENTION

An object of the present invention is to provide a marked film sheet, particularly a large size marked film sheet having a clear and precise pattern which is used for interior decorations such as a wall sheet, and a sheet for marking which is used for manufacturing the marked film sheet.

Another object of the present invention is to provide a method of manufacturing a marked sheet having an original pattern on a small scale at a low cost.

The above object can be achieved, according to a first aspect of the present invention, by provision of a sheet for marking which includes a transparent sheet having a suitable uneven pattern on the surface; and an intermediate layer, a transparent ink retaining layer and an opaque ink transport layer which are sequentially provided on the rear surface of the transparent sheet. The transparent sheet may be made of polyvinyl chloride; and the intermediate layer may comprise a plasticizer exudation preventive member and may preferably be in the form of a transparent polyethylene terephthalate sheet.

According to a second aspect of the present invention, there is provided a marked sheet, which includes a transparent sheet having a suitable uneven pattern on the front surface; and an intermediate layer, a transparent ink retaining layer and an opaque ink transporting layer which are sequentially provided on the rear surface of the transparent sheet; wherein a pattern is formed in the ink retaining layer. In this method, a backing sheet may be provided on the marked sheet. The transparent sheet may be made of polyvinyl chloride; and the intermediate layer may contain a plasticizer exudation preventive member, and it may be preferably formed of a transparent polyethylene terephthalate sheet. The transparent sheet may be formed of a previously colored film, and either of the above sheet and layers may contain a pearl pigment.

According to a third aspect of the present invention, there is provided a method of manufacturing a marked sheet which includes the steps of: preparing a sheet in which a transparent ink retaining layer and an opaque ink transporting layer are sequentially disposed on a transparent substrate; performing ink jet recording from the side of the surface of the ink transporting layer for forming a pattern in the ink retaining layer of the sheet; and providing a backing sheet on the surface of the ink transport layer. The transparent substrate may be a polyvinyl chloride sheet having a suitable uneven pattern on one surface. The transparent substrate may be further formed of a polyethylene terephthalate film sheet, and a transparent polyvinyl chloride sheet having a suitable uneven pattern on the front surface may be bonded on the above polyethylene terephthalate film sheet. Moreover, the backing sheet may be formed of a paper sheet.

According to a fourth aspect of the present invention, there is provided a sheet member, wherein the above-described marked sheet is stuck on a building material, glass or plastic.

DETAILED DESCRIPTION OF THE PREFERRED EMBODIMENTS

Figure 1:
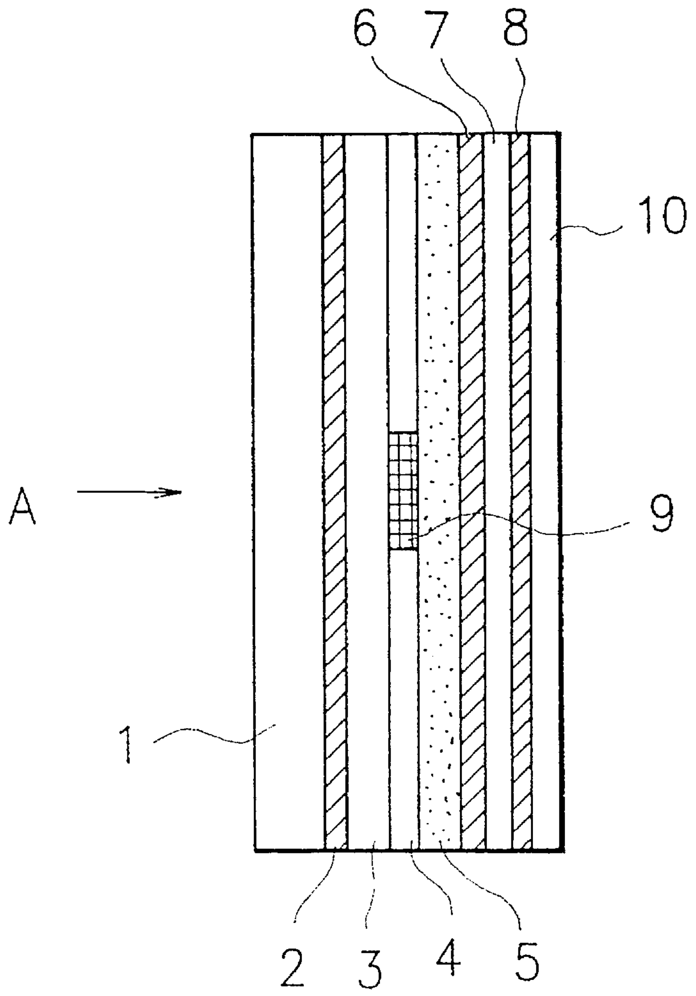
FIG. 1 is a sectional view of one embodiment of a marked sheet of the present invention.

FIG. 1 is a sectional view showing an exemplary construction of the present invention. In this figure, a transparent polyethylene terephthalate film 3 as an intermediate layer is bonded, by way of a transparent gluing agent (adhesive) layer 2, to a transparent polyvinyl chloride sheet 1 having an uneven pattern on the side of the arrow A.

The polyethylene terephthalate film 3 is adapted to prevent the exudation of a plasticizer from the polyvinyl chloride sheet 1, and which serves a substrate of an ink retaining layer 4 and an ink transporting layer 5 described later. An image 9 is formed on the ink retaining layer 4 by an ink jet recording system by way of the ink transport layer 5.

The ink transporting layer 5 is an opaque porous layer mainly made of particles and binder resin not colored by dye in the ink. The ink retaining layer 4 is a transparent resin layer mainly made of hydrophilic resin. The image 9 is formed by a method wherein the majority of ink droplets applied to the surface of the ink transporting layer by an ink jet recording method permeate the ink transporting layer and are held in the ink retaining layer. The recording medium formed of the translucent substrate, ink retaining layer and ink transporting layer is described, for example in Unexamined Japanese Patent Publication No. SHO 62-280068.

A backing sheet 7 is not essential in the present invention. After the formation of a recording image by the ink jet system, the backing sheet 7 is formed on the ink transporting layer by way of a gluing agent layer 6. The backing sheet 7 is effective to protect the ink transporting layer and to assist the opacity of the ink transporting layer in observation of the image from the side of the polyvinyl chloride sheet 1, and accordingly, the backing sheet 7 is preferably provided to obtain the clear image with a high contrast.

A gluing agent layer 8 is provided to stick this decorative sheet on a building material, window glass or plastic. In this example, the gluing agent layer 8 may be previously formed on the rear surface of the backing sheet 7; however, it may be directly coated on the backing sheet 7 or a member to be stuck such as a wall, window glass or plastic in use. A separation paper 10, being generally used as a mold releasing paper, is adapted to protect the gluing agent surface and to enhance the handling of the sheet, and which is separated from the sheet in use. Where the gluing agent layer 8 is of a type of exhibiting the stickiness by heating, pressurization or addition of water content in use, or where it is of a type being coated on the member to be stuck by an user in Use as described above, the separation paper 10 is not required to be formed.

Figure 2:
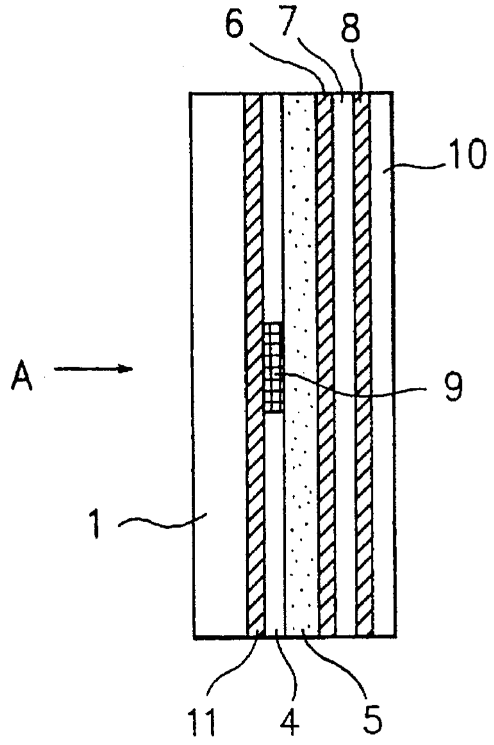
FIG. 2 is a sectional view of another embodiment of a marked sheet of the present invention.

FIG. 2 is a sectional view showing another construction of the present invention. In this figure, the gluing agent layer 2 and the polyethylene terephthalate film 3 shown in FIG. 1 are replaced by a plasticizer exudation preventive layer (member) 11.

In the present invention, from the reason described above, the image observation surface is preferably formed of a polyvinyl chloride resin sheet 1. The polyvinyl chloride sheet 1 usually contains the plasticizer components such as DOP, DIDP and DNOPD. These plasticizer components are exuded with time in the ink retaining layer 4 in which a recording image is formed; consequently, the dye as the recording agent present in the ink retaining layer 4 is dissolved and diffused in the transferred plasticizer components, thus blurring the image. Therefore, the plasticizer exudation preventive member 11 for preventing the exudation of the plasticizer into the ink retaining layer 4 is necessary to be disposed between the polyvinyl chloride sheet 1 and the ink retaining layer 4.

The plasticizer exudation preventive member 11 is required to be transparent, and may be formed of a plastic film sheet, glass sheet or the like as shown in the example of FIG. 1, or it may be formed by a coating of resin, which does not allow the exudation of the plasticizer components, between the polyvinyl chloride sheet and the ink retaining layer 4.

The plasticizer exudation preventive member 11 is preferably formed of a material difficult to be dissolved in the above plasticizer such as DOP, for example polyvinyl acetate, cellulose acetate or the like. Where the plasticizer exudation preventive member 11 is formed of a premolded plastic film preferably having a thickness of 20 μm or more and is stuck on the polyvinyl chloride sheet by means of adhesive or the like, it is preferably formed of a polyester or polyolefin resin film, in addition to the above materials, and further it may be formed of a resin excluding those easily dissolved in DOP (for example, polystyrene, polyvinyl chloride, polymethacrylate, cellulose nitrate and the like).

The thickness of the polyvinyl chloride sheet 1 is preferably in the range from 10 μm to 50 mm.

The material of the gluing agent (adhesive) layer 2 may include the known adhesives or gluing agents such as a natural rubber base, modified rubber base, synthetic rubber base, polyacrylic ester base, cellulose base, polyvinyl acetate base, polyvinyl pyrolidone base, polyester base, polyvinyl ether, polyvinyl butyral base, urethane base, acrylic base, epoxy base, silicon base, melamine base, and urea base. The thickness of the adhesive layer 2 is preferably in the range from about 1 to about 100 μm.

The material of the gluing agent layers 6 and 8 may include starch paste and glue, as well as the materials suitable for the above adhesive layer 2. The thickness of each of the gluing agent layers 6 and 8 is the same as that of the adhesive layer 2.

The ink retaining layer 4 is a transparent continuous film mainly containing hydrophilic resin, and the ink transporting layer 5 is an opaque porous layer mainly containing inorganic or organic particles and a binder resin. The materials and the desirable thicknesses of these layers are fully described in the above described Unexamined Japanese Patent Publication No. SHO 62-280068 and the like, and they are applied to the present invention.

The material of the backing sheet 7 is not particularly limited as long as it has a sufficient transparency, and may include a paper sheet, cloth, plastic sheet and glass.

The separation paper 10 may include a paper sheet or plastic film having the surface treated by silicon, fluoride or wax for enhancing the separability.

A method of preparing a marked film sheet of the present invention will be described below. In the case where a plastic film such as a polyethylene terephthalate (PET) sheet serving as a plasticizer exudation preventive member is provided with an ink retaining layer and an ink transporting layer, and it is then stuck on a polyvinyl chloride sheet (the form of the exemplary construction shown in FIG. 1), the above method includes the steps of:

1) sequentially forming an ink retaining layer and an ink transporting layer on a PET film or the like, performing ink jet recording from the side of the surface of the ink transporting layer, and sticking a polyvinyl chloride sheet on the PET film and a backing sheet on the ink transporting layer; or 2) sticking a PET film or the like on a polyvinyl chloride sheet, sequentially forming an ink retaining layer and an ink transporting layer on the PET film, performing ink jet recording, and sticking a backing sheet on the ink transporting layer; or 3) sequentially forming an ink retaining layer and an ink transporting layer on a PET film or the like, sticking a polyvinyl chloride sheet on the PET film, performing ink jet recording, and sticking a backing sheet on the ink transport layer.

In the case where an ink retaining layer and an ink transporting layer are directly provided on a polyvinyl chloride sheet through a plasticizer exudation preventive layer 11 (the form of the exemplary construction shown in FIG. 2), the method of preparing a marked film sheet includes the steps of:

1) sequentially forming a plasticizer exudation preventive layer 11, an ink retaining layer and an ink transporting layer on a polyvinyl chloride sheet on its surface opposed to that applied with an uneven pattern, performing ink jet recording from the surface of the ink transporting layer, and sticking a backing sheet to the transporting layer; or 2) forming layers on a separable substrate, separating the layers from the substrate, and laminating the stack of layers on a polyvinyl chloride sheet.

However, in directly coating each layer on the polyvinyl chloride sheet, the drying temperature of a coating solution must be kept at the softening point or less of the polyvinyl chloride sheet (about 55° C. or less), and therefore, this method is not suitable for practical use.

In either of these methods, the ink retaining layer, ink transporting layer and plasticizer exudation preventive layer are obtained by the steps of dissolving or dispersing a composition required to form each layer, which may be combined with another additive as needed, in water or alcohol, or another suitable organic solvent, thereby preparing a coating solution; coating the coating solution thus obtained on the surface on which each layer should be formed, by a roll coater method, blade coater method, air knife coater method, gate roll coater method, bar coater method, size press method, spray coat method, gravure coater method or curtain coater method; and drying the coated layers using a hot air drying furnace or a thermal drum.

As for the sticking performed between a PET sheet and a polyvinyl chloride sheet, and between the surface of an ink transporting layer and a backing sheet, it is performed by the steps of coating one kind or more of solutions or dispersion liquids of the above adhesives and gluing agents on either or both of the surfaces to be bonded, and sticking both the surfaces to each other and drying them; or coating the adhesive on the surfaces to be bonded, drying the coated adhesive once and giving water or steam to the adhesive upon sticking for enhancing the stickiness thereof, and sticking both the surfaces to each other; or coating a pressure-sensitive or temperature-sensitive adhesive to the surfaces to be bonded, drying the adhesive once, and sticking both the surfaces to each other while applying pressure or temperature to the surfaces upon sticking.

Where the gluing layer 10 is previously formed, it may be formed on a backing sheet in the same manner as described above. In this case, a separation paper is usually stuck on the gluing surface of the gluing layer 10 for enhancing the handling of the marked sheet.

The gluing layer 10 may be formed of a material having a re-separability, so that the marked sheet can be easily stuck and removed. According to the present invention, the marked sheet with any pattern can be produced on a small scale. Thus, by use of such a sheet as a wall paper, the interior decoration can be easily changed.

The present invention is intended to form patterns by an ink jet recording system; however, not all of the patterns are required to be formed by the ink jet recording system, and may be formed by the ink jet recording system combined with a conventional system. For example, in the case where the background is uniformly colored, only the background is formed using a colored polyvinyl chloride sheet, and the remaining pattern may be formed by the ink jet recording system, as a result of which the patterns having the excellent uniformity in the background can be formed at a low cost as compared with the case of using only the ink jet system.

A pearl pigment such as metal powder, synthetic mica, guanine, oxybismuth chloride may be added to the transparent portion of the image surface of the polyvinyl chloride, ink retaining layer and the like to obtain a marked sheet having pearl brightness suitable for interior decoration.

A marked sheet having a three-dimensional pattern can be obtained by forming a pattern so as to be matched to the uneven pattern on the front surface of the sheet.

An aromatic may be contained in a sheet material, which is particularly suitable for a wall paper.

An ink jet recording system for forming a pattern in the marked sheet of the present invention will be described below.

Ink known in the art may be used for ink jet recording with no problem. A recording agent is not particularly limited, and may include those used for the usual ink jet recording, for example, a water-soluble dye or dispersion dye represented by direct dye, acidic dye, basic dye, reactive dye, food dye, oil-soluble dye, and a pigment. The recording agent is generally contained in the conventional ink in an amount of 0.1 to 20 wt. %, which may be applied to the present invention.

The solvent used for the ink of the present invention includes water and a mixed solvent of water and a water-soluble organic solvent, and preferably a mixed solvent of water and a water-soluble organic solvent containing polyhydric alcohol having the effect of preventing the drying of the ink.

The ink jet recording method may be of any type in which the ink is effectively dispersed from an orifice and is given to a sheet for marking as an objective. In particular, an ink jet method described in Unexamined Japanese Patent Publication No. SHO 54-59936 can be effectively used for the present invention, wherein an ink applied with the action of thermal energy is abruptly changed in volume, and thereby the ink is discharged from an orifice by the force generated by the change in volume.

Figure 3:
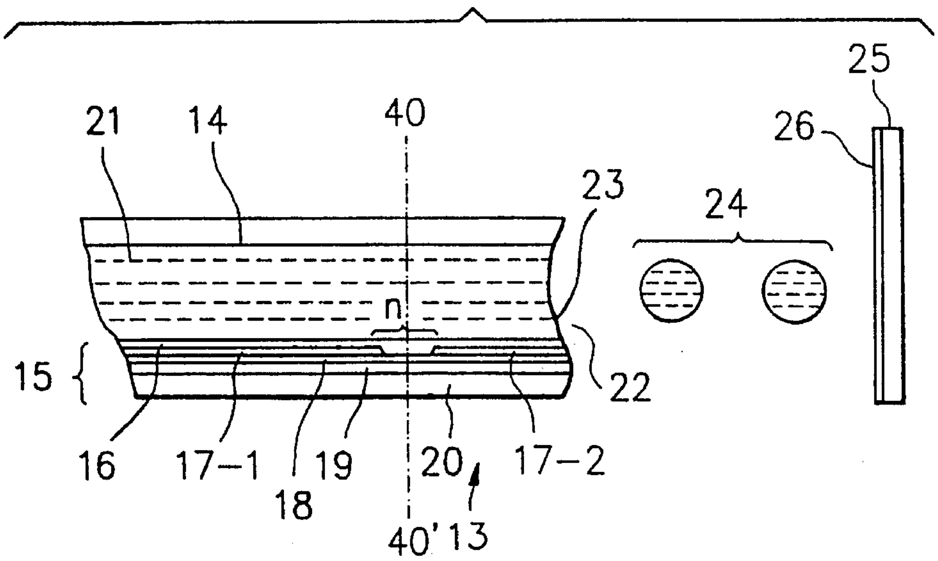
FIG. 3 is a vertical sectional view showing the construction of a recording head of an ink jet recording apparatus used in a method of the present invention.
Figure 4:
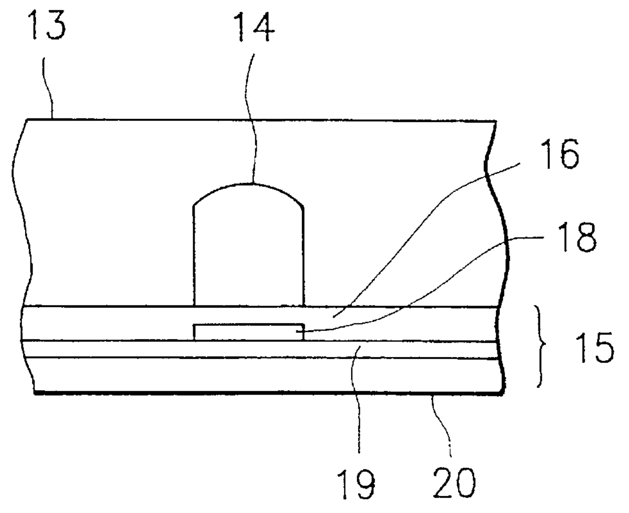
FIG. 4 is a transverse sectional view taken along the line 40—40' of FIG. 3.
Figure 5:
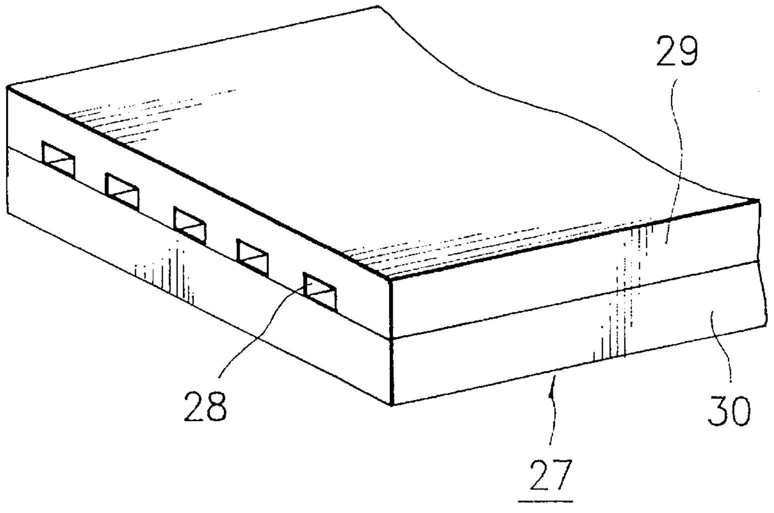
FIG. 5 is a perspective view showing the construction of a multi-head in which a plurality of recording heads shown in FIG. 3 are disposed.

The exemplary construction of an ink jet recording head preferably usable for the present invention is shown in FIGS. 3, 4 and 5.

A head 13 is obtained by bonding a glass, ceramic or plastic plate having a groove 14 for passing ink therethrough to a heating head 15 used for thermally sensitive recording (another type different from that shown in the figure may be used). The heating head 15 includes a protective film 16 formed of silicon oxide, aluminum electrodes 17-1 and 17-2, a heating resistance layer 18 formed of nichrome, a heat storage layer 19, a substrate 20 having excellent heat discharge performance which is made of alumina or the like. An ink 21 reaches a discharge orifice (fine hole) 22, and forms a meniscus 23 by a pressure P.

Now, when an electrical signal is applied to the electrodes 17-1 and 17-2, the region shown by n of the heating head 15 abruptly generates heat, and bubbles are generated in the ink 21 in contacted with the region n. The meniscus 23 projects by the pressure of the bubbles, and the ink is discharged in the form of a recording droplet 24 from the orifice 22 and flies toward the substance to be recorded. FIG. 5 shows the appearance of a multi-head in which a number of the heads shown in FIG. 3 are disposed. The multi-head is manufactured by joining a glass plate 27 having multiple grooves 26 to heating heads 28 each having a structure similar to that shown in FIG. 3.

In addition, FIG. 3 is a sectional view of the head 13 taken along the ink flow path, and FIG. 4 is a sectional view taken along the line 40—40' of FIG. 3.

Figure 6:
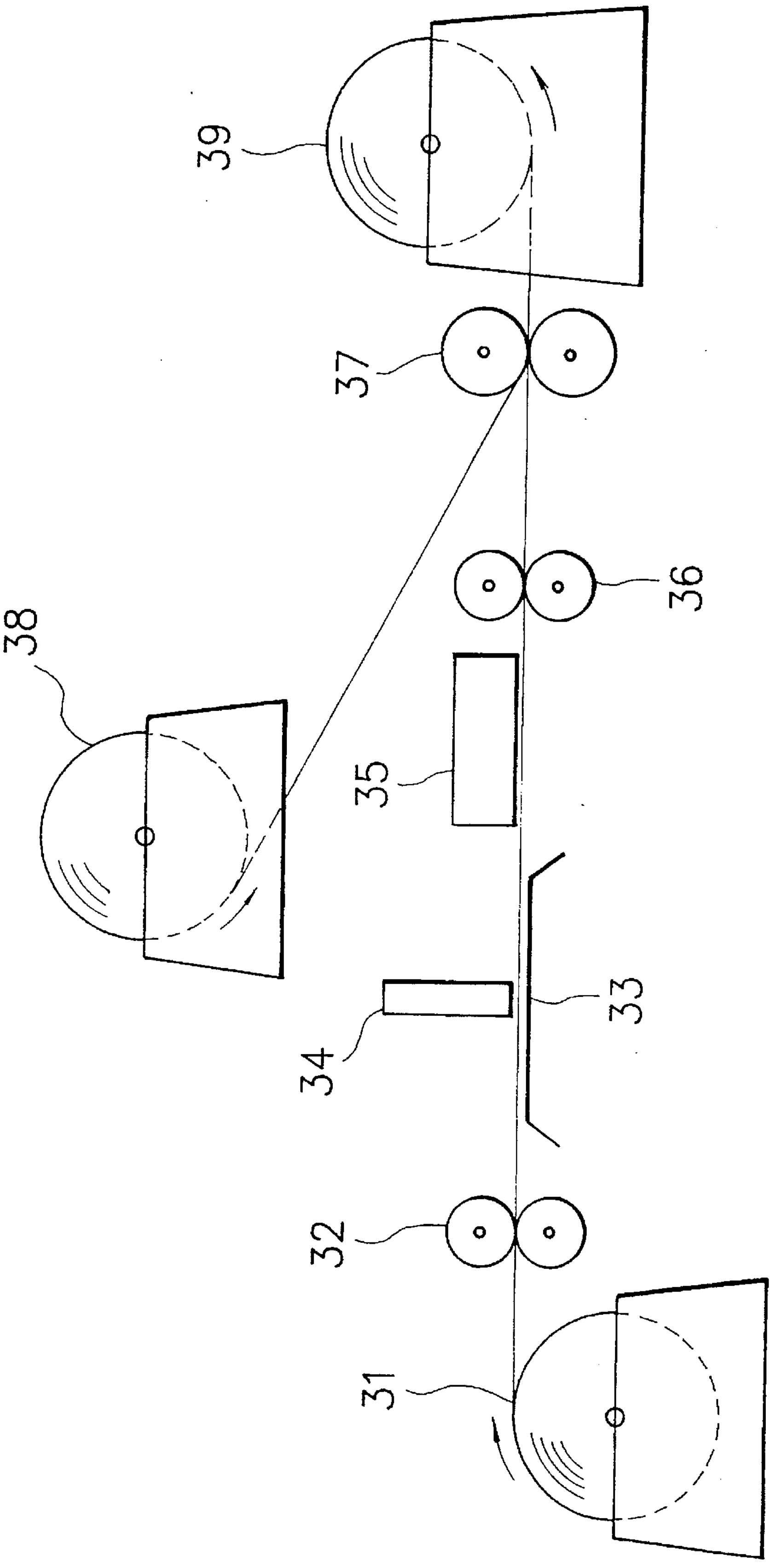
FIG. 6 is a view showing one example of an apparatus for manufacturing a marked sheet of the present invention.

FIG. 6 shows an example of an apparatus for performing ink jet recording on a sheet for marking according to the present invention and sticking a backing sheet thereto. A rolled sheet material 31 wound such that the side with the ink transport layer is directed outward is fed to a recording portion by a carrier roller 32. At the recording portion, an ink jet recording head 34 for discharging ink is disposed at a position facing the surface of the ink transporting layer. The ink jet recording head 34 discharges ink in the form of droplets according to an image signal supplied from a controller (not shown), and forms a pattern. A recording guide 33 is positioned on the rear surface side of the sheet material opposed to the recording head 34 for holding the sheet material in the flat state during recording. The reference numeral 35 designates a hot-air drying means for drying a solvent in the ink after recording. A backing sheet 38 is obtained by coating a gluing agent of acrylic emulsion base on a woodfree paper, and drying it so that the surface is not sticky. It is wound so that the gluing agent surface is directed outward. The backing paper sheet 38 and the recorded sheet material 31 are bonded to each other by way of heat press by means of heat pressing rollers 37 so that the recording surface is bonded to the gluing agent surface.

On the other hand, there is prepared a polyvinyl chloride sheet which is previously applied with an embossing pattern on one surface (for example, gratings with intervals of 2 mm, each having a projection with a width of 0.5 mm and a height of 0.5 mm). The PET surface of the above rolled sheet material 39 is bonded to the other surface with no embossing pattern of the polyvinyl chloride sheet by an acrylic resin based adhesive, thus obtaining a marked film sheet of the present invention. The bonding of the PET surface on the polyvinyl chloride sheet may be performed by any of the known methods, for example, by the same method as that used for sticking the ink transport layer on the backing sheet.

The present invention will be described in detail by way of example. In addition, the term "parts" means parts by weight, unless stated otherwise.

EXAMPLE 1

As a substrate for forming an ink retaining layer and an ink transporting layer and serving as a plasticizer exudation preventive member for preventing plasticizer components in a polyvinyl chloride sheet, a transparent polyethylene terephthalate film (thickness: 100 μm, sold by TORAY INDUSTRIES) was used. The following coating composition A was coated on the above film to a dry thickness of 8 μm by a blade coater, and was dried for 5 min in a dry furnace at 140° C. The following coating composition B was then coated on the above coating composition A to a dry thickness of 25 μm by the blade coater and was dried for 2 min in the drying furnace at 140° C.

| | |
|---|---|
| Composition A | |
| cationic polyvinyl alcohol (PVA-CM-318, produced by KURARAY Co., Ltd.) | 100 parts |
| blocked polyisocyanate (Elastron BN-5, produced by DAI-ICHI KOGYO SEIYAKU Co., Ltd.) | 15 parts |
| reactive catalyst (Elastron-catalyst 64, produced by DAI-ICHI KOGYO SEIYAKU Co., Ltd.) | 1 part |
| water | 1000 parts |
| Composition B | |
| urea formaldehyde resin particles (produced by NIPPON KASEI CHEMICAL Co., Ltd.) | 100 parts |
| polyvinylacetal (Eslec BX-1, produced by SEKISUI CHEMICAL Co., Ltd.) | 15 parts |
| surfactant (Surfrone 104, produced by NISSIN CHEMICAL Co., Ltd.) | 0.3 parts |
| water/isopropyl alcohol mixture | 800 parts |

Ink jet recording was performed on the sheet for marking thus obtained from the side of the surface of the ink transporting layer, to form a pattern for a marked sheet, and the recording surface was dried.

A woodfree paper coated with a gluing agent as a backing sheet was bonded by way of heat press on the surface of the ink transporting layer, thus forming a sheet.

On the other hand, there was prepared a polyvinyl chloride sheet having one surface applied with an embossing pattern (gratings with intervals of 2 mm, each having a projection with a width of 0.5 mm and a height of 0.5 mm). The other surface with no embossing pattern of the polyvinyl chloride sheet was bonded on the PET surface of the above sheet by means of an acrylic resin based adhesive, thus obtaining a marked film sheet of the present invention.

The marked film sheet thus obtained is used as follows: namely, starch paste or the like is coated on a body to be decorated such as a wall or a window glass, or the backing sheet surface, and the backing sheet is bonded on the body to be decorated.

EXAMPLE 2

The same polyvinyl chloride sheet as in Example 1 was stuck on the PET surface of the sheet obtained by the method shown in Example 1. After that, ink jet recording was performed from the surface of the ink transporting layer to form a pattern for a marked sheet, and the recording surface was dried by hot air. Then, a synthetic paper (trade name: YUPO) coated with a gluing agent as the backing sheet was bonded by way of heat press on the surface of the ink transport layer. The above processing steps were made in the same manner as in Example 1.

The opposed surface of the above synthetic paper was coated with a gluing agent and was stuck on the treated surface of a separation paper (thickness: 40 μm, produced by NIPPON KAKOH SEISHI K. K.), thus obtaining a marked sheet of the present invention. The marked sheet thus obtained is used as follows: namely, the separation paper is separated and the gluing agent surface is stuck on a body to be decorated.

EXAMPLE 3

A polyvinyl chloride sheet (thickness: 0.5 mm) having one surface applied with the same embossing pattern as described above was used as a substrate. The following composition C was coated on the non-treated surface of the substrate to a dry thickness of 3 μm, and was dried for 20 min in a drying furnace at 50° C. The following composition D was further coated on the composition C to a dry thickness of 6 μm using a blade coater, and was dried for 20 min in a drying furnace at 50° C. Then, the following composition E was further coated on the composition D to a dry thickness of 28μm using the blade coater, and was dried for 60 min in a drying furnace at 50° C., thus preparing a sheet for marking.

Composition C

Composition C is a solution containing ethyl acetate and polyvinyl acetate (Gosenyl E-50, produced by NIPPON GOSEI CHEMICAL Co., Ltd.) whose solid content is 30 wt. %.

| | |
|---|---|
| Composition D | |
| polyvinyl alcohol (PVA-224, produced by KURARAY Co., Ltd.) | 15 parts |
| water | 90 parts |
| Composition E | |
| polymethacrylic resin particles (Microsphere M, produced by MATSUMOTO YUSHI-SEIYAKU K.K.) | 100 parts |
| polyvinyl pyrrolidone (PVP K-30, produced by GAF Company) | 35 parts |
| surfactant (Pelex OTP, produced by KAO SOAP Co., Ltd.) | 0.2 parts |
| isopropyl alcohol | 800 parts |

Ink jet recording was performed to the sheet for marking thus obtained from the side of the surface of the ink transporting layer, to form a pattern on the sheet for marking, and the recording surface was dried by hot air at a temperature of 50° C. or less. After that, a synthetic paper (trade name, YUPO) coated with a gluing agent was bonded by way of heat press on the surface of the ink transporting layer. The above processing steps were made in the same manner as in Example 1.

The opposed surface of the above synthetic paper was coated with a gluing agent, and was stuck on the treated surface of a separation paper (thickness: 40 μm, produced by NIPPON KAKOH SEISHI CHEMICAL Co., Ltd.), thus obtaining a marked sheet of the present invention.

The marked sheet of the present invention is used as follows: namely, the separation paper is separated and the exposed sticking surface is stuck on a body to be decorated.

EXAMPLE 4

In place of sticking of the backing sheet on the marked sheet formed with the pattern in Example 2, the surface of the ink transporting layer was stuck on a glass plate using a commercially available two-sided tape. A fluorescent lamp was provided behind the glass plate of the member thus obtained for lighting the member, as a result of which a bright image with a high contrast suitable for an interior decoration was observed from the side of the marked sheet.

EXAMPLE 5

As the polyvinyl chloride sheet in Example 2, one with a light blue tint was used. The marked sheet thus obtained has a pattern having a light blue tint background, which is used as a wall paper, for example by sticking it on an internal wall of a house by means of starch paste coated on the backing sheet. Moreover, in the case that the marked sheet is stuck on a glass window, it is separable by dampening it after drying; accordingly, it is possible to freely use a favorite one from various sheets obtained by forming various patterns on the sheets for marking in Example 2 using the ink jet recording system.

EXAMPLE 6

A pearl pigment (Iriodine 100, produced by Merck Japan Co., Ltd.) was added to the composition A Example 1 in an amount of 5 parts, and the sheet was formed in the same manner as in Example 1. A marked sheet having a pattern with a pearl bright background was obtained.

EXAMPLE 7

Using a polyvinyl chloride sheet without an embossing pattern as the substrate in Example 3, a marked sheet was obtained in the same manner as in Example 3. The marked sheet having a calm brightness on the surface was obtained.

As described above, according to the present invention, a pattern is formed using a color ink jet recording system, so that a marked sheet with a clear and precise pattern can be obtained. Moreover, according to the present invention, since a pattern is formed by the recording performed on the basis of an image signal directly transmitted from a controller for an ink jet recording head to the recording head, marked sheets with an original pattern can be simply obtained on a small scale at a low cost.

We claim:

1. A marking sheet, comprising a transparent sheet (a) formed of polyvinyl chloride which has an embossed pattern on the front surface thereof; and a transparent sheet (b) formed of polyethylene terephthalate, a transparent ink retaining layer (c) containing a hydrophilic resin and an opaque ink transporting layer (d) which are sequentially disposed on the rear surface of said transparent sheet (a).

2. A marked sheet, comprising a transparent sheet (a) formed of polyvinyl chloride which has an embossed pattern on the front surface thereof; and a transparent sheet (b) formed of polyethylene terephthalate, a transparent ink retaining layer (c) containing a hydrophilic resin and an opaque ink transporting layer (d) which are sequentially disposed on the rear surface of said transparent sheet (a), wherein an image is formed in said ink retaining layer.

3. A marked sheet according to claim 2, further comprising a backing sheet disposed on the ink transporting layer (d).

4. A marked sheet according to claim 2, wherein the sheet (a) is colored.

5. A marked sheet according to claim 2, wherein one or more of the sheet (b) and the layers (c) and (d) contain a pearl pigment.

6. A marking sheet according to claim 1, wherein the sheet (a) is colored.

7. A marking sheet according to claim 1, wherein the sheet (a) has a thickness in the range of from 10 μm to 50 mm.

8. A marking sheet according to claim 1 further comprising an adhesive layer interposed between the transparent sheet (a) and the transparent sheet (b).

9. A marking sheet according to claim 8, wherein the adhesive layer has a thickness in the range of from 1 μm to 100 μm.

10. A marking sheet according to claim 1, wherein the ink transporting layer (d) contains an inorganic or organic particle and a binder.

11. A marked sheet according to claim 3 further comprising a separation paper disposed on the backing sheet by an adhesive layer.

12. A marked sheet according to claim 11, wherein the separation paper is a paper sheet or plastic film having a surface treated by a material selected from the group consisting of silicon, fluoride and wax.

13. A marked sheet according to claim 2 further comprising an adhesive layer interposed between the transparent sheet (a) and the transparent sheet (b).

14. A marked sheet according to claim 13, wherein the adhesive layer has a thickness in the range of from 1 μm to 100 μm.

15. A marked sheet according to claim 2, wherein the ink transporting layer (d) contains an inorganic or organic particle and a binder.

* * * * *

UNITED STATES PATENT AND TRADEMARK OFFICE

CERTIFICATE OF CORRECTION

PATENT NO. : 5,601,928 Page 1 of 2

DATED : February 11, 1997

INVENTOR(S) : MASATO KATAYAMA, ET AL.

It is certified that error appears in the above-indentified patent and that said Letters Patent is hereby corrected as shown below:

COLUMN 1

Line 32, "restricted" should read --restricted to--.

COLUMN 3

Line 48, "an user in Use" should read --a user in use--.

COLUMN 7

Line 4, "contacted" should read --contact--.

COLUMN 11

Line 1, "claim 1" should read --claim 1,--; and
Line 10, "claim 3" should read --claim 3,--.

UNITED STATES PATENT AND TRADEMARK OFFICE

CERTIFICATE OF CORRECTION

PATENT NO. : 5,601,928 Page 2 of 2

DATED : February 11, 1997

INVENTOR(S) : MASATO KATAYAMA, ET AL.

It is certified that error appears in the above-indentified patent and that said Letters Patent is hereby corrected as shown below:

COLUMN 12

Line 3, "claim 2" should read --claim 2,--.

Signed and Sealed this

Twelfth Day of August, 1997

Attest:

BRUCE LEHMAN

Attesting Officer

*Commissioner of Patents and Trademarks*